United States Patent
Tanaka et al.

(10) Patent No.: US 9,804,458 B2
(45) Date of Patent: Oct. 31, 2017

(54) LIQUID-CRYSTAL DISPLAY DEVICE AND ELECTRONIC APPARATUS

(71) Applicant: Japan Display Inc., Tokyo (JP)

(72) Inventors: Hiromichi Tanaka, Tokyo (JP); Yoshihito Horiuchi, Tokyo (JP); Yasuo Kawakubo, Tokyo (JP)

(73) Assignee: Japan Display Inc., Tokyo (JP)

( * ) Notice: Subject to any disclaimer, the term of this patent is extended or adjusted under 35 U.S.C. 154(b) by 65 days.

(21) Appl. No.: 14/685,814

(22) Filed: Apr. 14, 2015

(65) Prior Publication Data
US 2015/0293388 A1 Oct. 15, 2015

(30) Foreign Application Priority Data

Apr. 15, 2014 (JP) .................................. 2014-083921

(51) Int. Cl.
*G02F 1/1345* (2006.01)
*G02F 1/1333* (2006.01)

(52) U.S. Cl.
CPC .................... *G02F 1/13452* (2013.01); *G02F 2001/13332* (2013.01)

(58) Field of Classification Search
CPC .................................................. G02F 1/13452
See application file for complete search history.

(56) References Cited

U.S. PATENT DOCUMENTS

| | | | | |
|---|---|---|---|---|
| 2009/0213534 A1* | 8/2009 | Sakai | ................... | G02F 1/13452 361/679.21 |
| 2012/0094413 A1* | 4/2012 | Song | ................... | G02F 1/13394 438/30 |
| 2014/0022472 A1* | 1/2014 | Kikuchi | ................ | G02F 1/1339 349/15 |
| 2014/0192491 A1* | 7/2014 | Chiang | .................... | H05K 3/32 361/750 |
| 2014/0285734 A1* | 9/2014 | Lin | ........................ | G06F 1/1643 349/12 |

FOREIGN PATENT DOCUMENTS

JP 2010-091966 4/2010
JP 2013-142812 7/2013

* cited by examiner

*Primary Examiner* — Edmond Lau
(74) *Attorney, Agent, or Firm* — K&L Gates LLP

(57) ABSTRACT

A liquid-crystal display device includes a display panel, a translucent cover substrate, and a plate spacer. The display panel includes a pixel substrate, a counter substrate facing the pixel substrate, a liquid-crystal layer interposed between the pixel substrate and the counter substrate, and a driver IC mounted on a protruding portion of the pixel substrate protruding from the counter substrate. The translucent cover substrate is bonded to the display panel. The plate spacer is formed in a rectangular plate shape and is fixed to a surface of the translucent cover substrate on the driver IC side. The plate spacer and the driver IC are fixed with a resin layer interposed therebetween.

6 Claims, 6 Drawing Sheets

LIQUID-CRYSTAL DISPLAY DEVICE AND ELECTRONIC APPARATUS

CROSS REFERENCES TO RELATED APPLICATIONS

The present application claims priority to Japanese Priority Patent Application JP 2014-083921 filed in the Japan Patent Office on Apr. 15, 2014, the entire content of which is hereby incorporated by reference.

BACKGROUND

1. Technical Field

The present invention relates to a liquid-crystal display device and an electronic apparatus.

2. Description of the Related Art

Japanese Patent Application Laid-open Publication No. 2010-91966 (JP-A-2010-91966) describes a technology of a liquid-crystal display device that can suppress a pooling phenomenon. In a pooling phenomenon, pushing pressure applied to an edge of a front plate with a finger or a touch pen causes a liquid-crystal display screen to look wavy around the pressed position.

Japanese Patent Application Laid-open Publication No. 2013-142812 describes a technology for preventing a transparent substrate from being damaged from a corner.

Liquid-crystal display devices are recently designed to have a translucent cover substrate, such as a translucent glass, arranged closer to an observer than a counter substrate. The translucent cover substrate may have functions as a touch panel that detects an external approaching object based on a change in an electrostatic capacitor, an input-output switch, a barrier substrate that performs stereoscopic display using binocular disparity, or a simple protector against external pushing pressure, for example.

Along with reduction in the thickness of electronic apparatuses to which such a liquid-crystal display device is mounted, a pixel substrate in the liquid-crystal display device is pressed from the inside. As a result, pressure may be applied from the back surface of a driver integrated circuit (IC) mounted surface of the pixel substrate toward the translucent cover substrate. The translucent cover substrate has an area and a thickness larger than those of the pixel substrate and is less likely to deform than the pixel substrate is. Because the counter substrate has an area smaller than that of the pixel substrate, the pixel substrate may possibly bend using a portion near the end of the counter substrate closer to the driver IC as a fulcrum. If a bend occurs, the influence of the bend changes the thickness of a liquid-crystal layer near the end closer to the driver IC. The change in the thickness of the liquid-crystal layer changes the orientation of liquid crystals. As a result, the observer may possibly recognize a change in color at an end of a display region in the liquid-crystal display device as display unevenness.

For the foregoing reasons, there is a need for a display device and an electronic apparatus that maintain display quality even if a pixel substrate is bent by combining with an accommodating member.

SUMMARY

According to an aspect, a liquid-crystal display device includes: a display panel; a translucent cover substrate; and a plate spacer. The display panel includes a pixel substrate, a counter substrate facing the pixel substrate, a liquid-crystal layer interposed between the pixel substrate and the counter substrate, and a driver IC mounted on a protruding portion of the pixel substrate protruding from the counter substrate. The translucent cover substrate is bonded to the display panel. The plate spacer is formed in a rectangular plate shape and is fixed to a surface of the translucent cover substrate on the driver IC side. The plate spacer and the driver IC are fixed with a resin layer interposed therebetween.

According to another aspect, an electronic apparatus includes: a liquid-crystal display device; and an accommodating member housing the liquid-crystal display device. The liquid-crystal display device includes: a display panel, a translucent cover substrate and a plate spacer. The display panel includes a pixel substrate, a counter substrate facing the pixel substrate, a liquid-crystal layer interposed between the pixel substrate and the counter substrate, and a driver IC mounted on a protruding portion of the pixel substrate protruding from the counter substrate. The translucent cover substrate is bonded to the display panel. The plate spacer is formed in a rectangular plate shape and is fixed to a surface of the translucent cover substrate on the driver IC side. The plate spacer and the driver IC are fixed with a resin layer interposed therebetween. A part of the accommodating member presses the pixel substrate.

Additional features and advantages are described herein, and will be apparent from the following Detailed Description and the figures.

DETAILED DESCRIPTION

Figure 1:
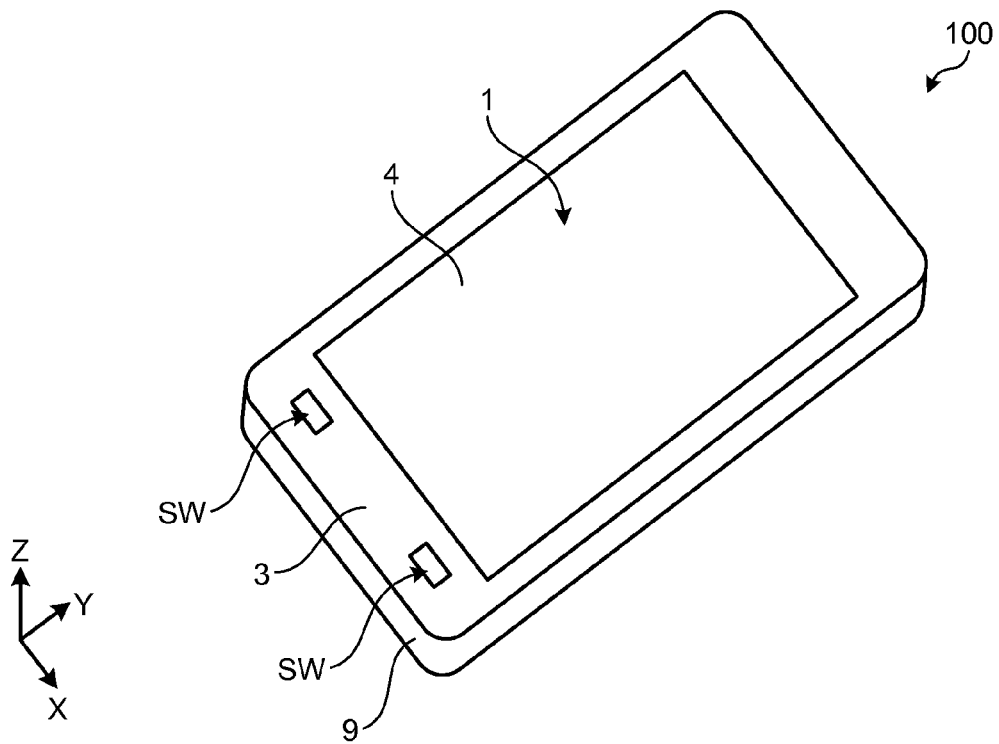
FIG. 1 is a perspective schematic for explaining an electronic apparatus including a liquid-crystal display device according to a present embodiment.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes and modifications made without departing from the gist of the invention and easily conceivable by those skilled in the art are naturally included in the scope of the invention. The drawings may possibly illustrate the width, the thickness, the shape, and the like of each unit more schematically than in the actual aspect to simplify the explanation. These elements, however, are given by way of example only and are not intended to limit interpretation of the invention. In the specification and the drawings, components similar to those previously described with reference to a preceding drawing are denoted by like reference numerals, and overlapping explanation thereof will be appropriately omitted.

FIG. 1 is a perspective schematic for explaining an electronic apparatus including a liquid-crystal display device according to an embodiment. In the description below, an XYZ orthogonal coordinate system is used, and the positional relation between units are described with reference to the XYZ orthogonal coordinate system. The X-axis direction serving as a direction in a horizontal plane is referred to as a width direction. The Y-axis direction serving as a direction orthogonal to the X-axis direction in the horizontal plane is referred to as a longitudinal direction. The Z-axis direction orthogonal to the X-axis direction and the Y-axis direction is referred to as a thickness direction. The X-axis is orthogonal to the YZ-plane, the Y-axis is orthogonal to the XZ-plane, and the Z-axis is orthogonal to the XY-plane. The XY-plane includes the X-axis and the Y-axis, the XZ-plane includes the X-axis and the Z-axis, and the YZ-plane includes the Y-axis and the Z-axis.

As illustrated in FIG. 1, an electronic apparatus 100 includes a housing frame (accommodating member) 9 and a liquid-crystal display device 1. The electronic apparatus 100 includes a display region 4 and a light shielding region 3. The display region 4 enables an observer to view the display in the thickness direction (Z-axis direction) of the liquid-crystal display device 1. The light shielding region 3 surrounds the outer periphery of the display region 4 and limits more transmissive light than the display region 4 does. A part of the light shielding region 3 may be provided with an electrostatic capacitive or mechanical switch SW having a wake-up function and an input-output function of the liquid-crystal display device 1 or the electronic apparatus 100.

Figure 2:
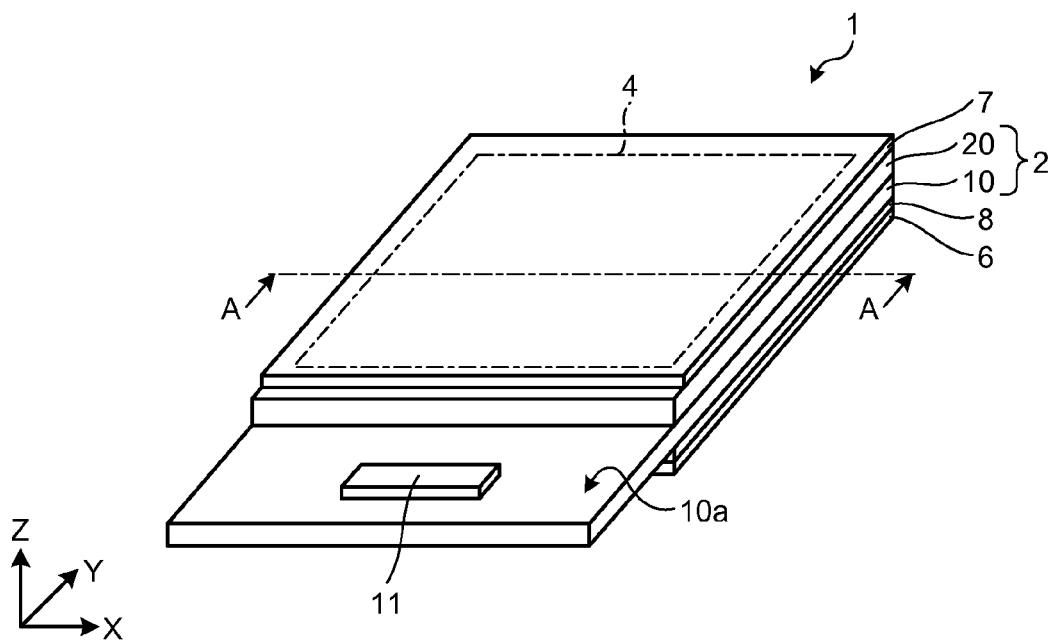
FIG. 2 is a perspective schematic for explaining the liquid-crystal display device according to the present embodiment.
Figure 3:
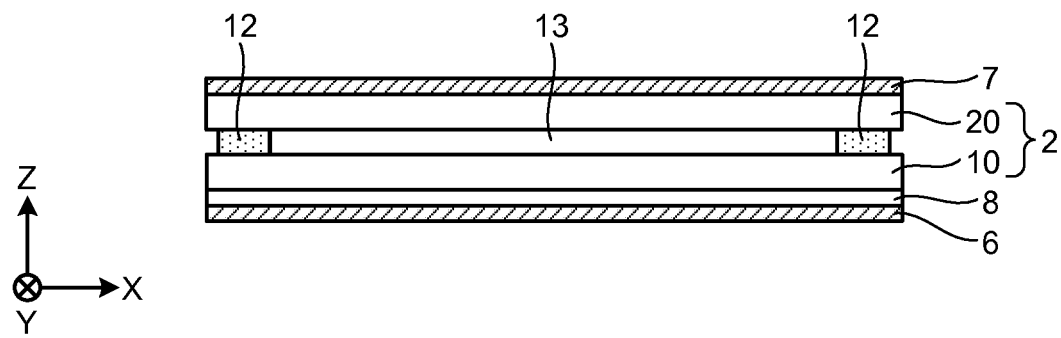
FIG. 3 is a sectional schematic for explaining the A-A section in FIG. 2.

FIG. 2 is a perspective schematic for explaining the liquid-crystal display device according to the present embodiment. FIG. 3 is a sectional schematic for explaining the A-A section in FIG. 2. As illustrated in FIG. 2, the liquid-crystal display device 1 includes a display panel 2, a polarizing plate 7 serving as a first polarizing plate, and a polarizing plate 6 serving as a second polarizing plate. The polarizing plates 7 and 6 are arranged in a manner sandwiching the display panel 2. The liquid-crystal display device 1 further includes a phase difference film 8 between the polarizing plate 6 and the display panel 2.

As illustrated in FIG. 3, the display panel 2 includes a pixel substrate 10 and a counter substrate 20 serving as a pair of substrates bonded in a facing manner with a frame-shaped sealing member 12 interposed therebetween. The space surrounded by the pixel substrate 10, the counter substrate 20, and the sealing member 12 is filled with liquid crystals and thus serves as a liquid-crystal layer 13.

The display panel 2 includes a number of pixels contributing to display and arranged in a matrix in a region filled with the liquid-crystal layer 13. The region in which the pixels contributing to display arranged in a matrix corresponds to the display region 4 illustrated in FIGS. 1 and 2.

As illustrated in FIG. 2, the pixel substrate 10 has a larger area than that of the counter substrate 20 in a planar view and is bonded to the counter substrate 20 with a part thereof protruding from the counter substrate 20. The protruding part is referred to as a protruding portion 10a and is provided with a driver IC 11 that drives the liquid-crystal layer 13. The polarizing plate 6 is arranged on the pixel substrate 10 side in the display panel 2, whereas the polarizing plate 7 is arranged on the counter substrate 20 side in the display panel 2. Thus, the polarizing plate 7, the display panel 2, the phase difference film 8, and the polarizing plate 6 are laminated in this order and are bonded to respective facing surfaces with an adhesive layer interposed therebetween.

The polarizing plate 6 illustrated in FIG. 2 includes a polarizer and a pair of translucent protective films bonded to both surfaces of the polarizer. Similarly, the polarizing plate 7 includes a polarizer and a pair of translucent protective films bonded to both surfaces of the polarizer. The polarizer may be a uniaxially stretched polyvinyl alcohol film onto which a dichroic material, such as iodine and a dichroic dye, is absorbed, for example. The protective film may be made of triacetylcellulose (TAC), for example. The phase difference film 8 may be a birefringent film, which is a high-polymer film, or a liquid-crystal polymer orientation film, for example. Another phase difference film may be provided between the polarizing plate 7 and the display panel 2 illustrated in FIG. 2. The polarizing plate 6, the polarizing plate 7, the phase difference film 8, the protective film, and the like are referred to as optical films. The optical films have an area larger than that of the display region 4 and equal to or smaller than that of the counter substrate 20.

Figure 4:
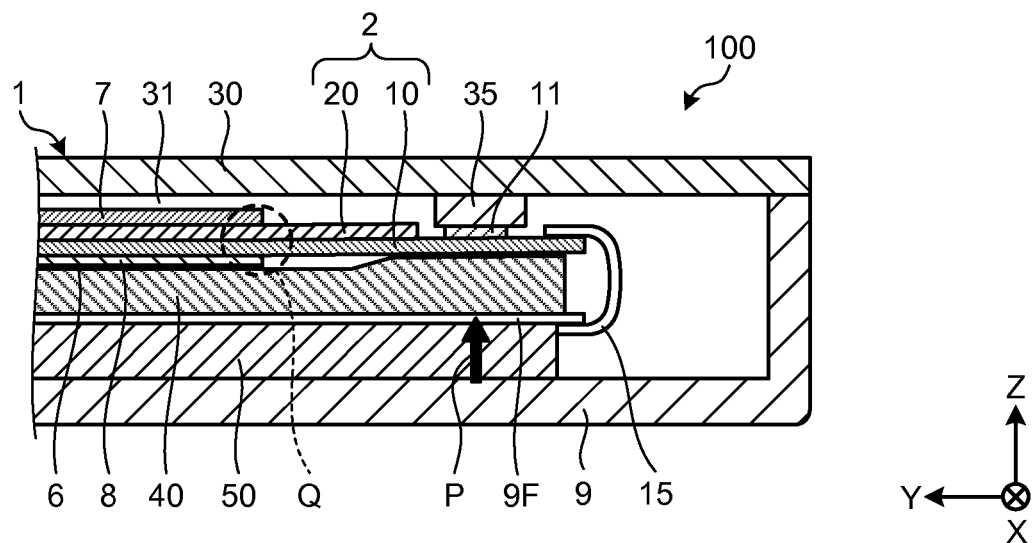
FIG. 4 is a partial sectional view for explaining a state where the liquid-crystal display device according to the present embodiment is arranged in a housing of the electronic apparatus.

FIG. 4 is a partial sectional view for explaining a state where the liquid-crystal display device according to the present embodiment is arranged in the housing of the electronic apparatus. As illustrated in FIG. 4, the liquid-crystal display device 1 includes a translucent cover substrate 30, the pixel substrate 10, the counter substrate 20, the polarizing plate 7, the polarizing plate 6, the phase difference film 8, a flexible printed circuit (FPC) substrate (flexible wiring substrate) 15, and a backlight (lighting device) 40. These components are housed in the housing frame (accommodating member) 9 together with a control unit 50 of the electronic apparatus 100. The translucent cover substrate 30, such as a translucent glass, is arranged closer to the observer than the counter substrate 20. The FPC substrate 15 is coupled to the pixel substrate 10 of the display panel 2. The backlight (lighting device) 40 irradiates the display panel 2 with light. The control unit 50 of the electronic apparatus 100 includes a power source, such as a secondary battery.

As illustrated in FIG. 4, the backlight (lighting device) 40 includes a light emitting diode (LED) (light source) that emits light, and a light guide plate. The backlight (lighting device) 40 can output backlight to the pixel substrate 10 of the display panel 2. The backlight (lighting device) 40 and the pixel substrate 10 of the display panel 2 are bonded with a double-sided adhesive light shielding sheet (adhesive tape) interposed therebetween. The double-sided light shielding sheet is a frame-shaped sheet the inside part other than the side end of which is bonded between the light guide plate and the display panel 2. The double-sided light shielding sheet has a light shielding property and prevents light leakage from the backlight (lighting device) 40. Thus, the double-sided light shielding sheet serves as a part of the light shielding region 3 of the display panel 2.

The inner surface (first surface) on a first end of the FPC substrate 15 is electrically coupled and bonded to a terminal on the protruding portion 10a on the translucent cover substrate 30 side of the pixel substrate 10 with an anisotropic conductive film (ACF) (conductive adhesive). A second end of the FPC substrate 15 is electrically coupled to the control unit 50 as illustrated in FIG. 4. The first end of the FPC substrate 15 is provided with wiring (not illustrated) conductively coupled to the input terminal arranged on the protruding portion 10a.

Figure 5:
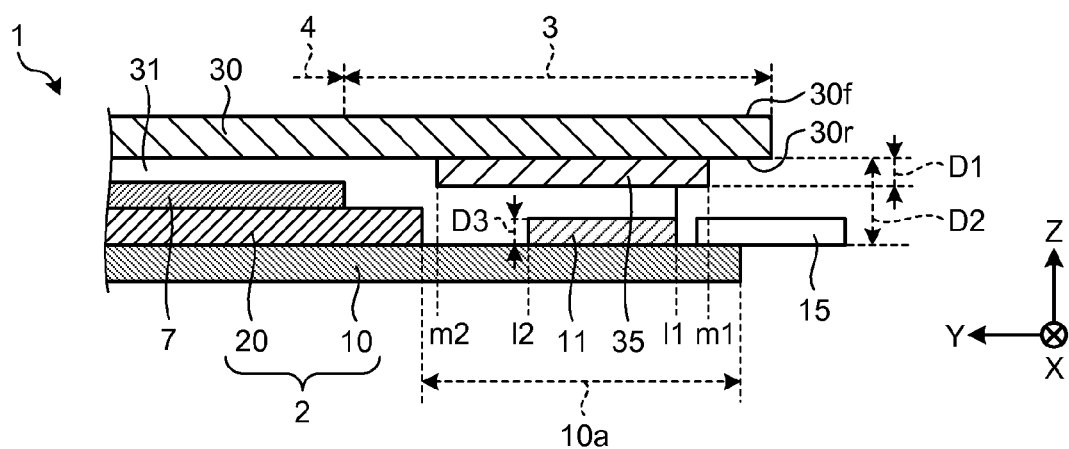
FIG. 5 is a partial sectional view of the liquid-crystal display device according to the present embodiment.
Figure 6:
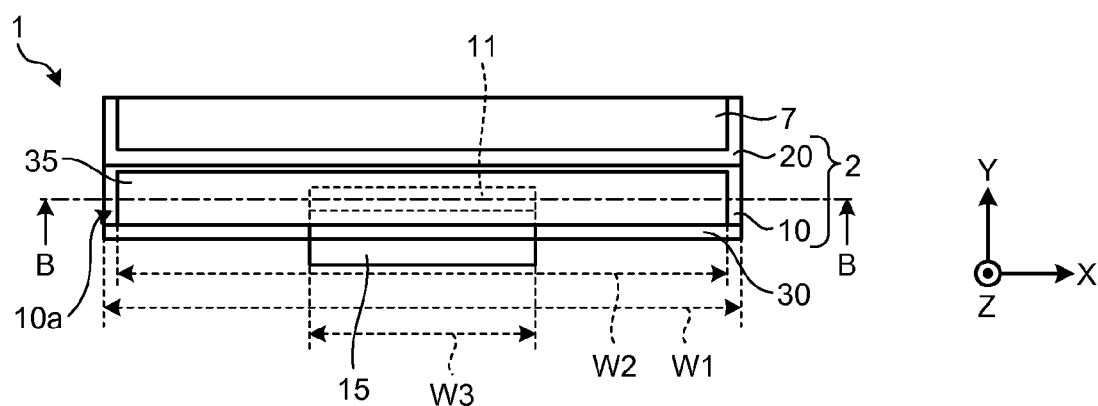
FIG. 6 is a plan view of the display device illustrated in FIG. 5 viewed from the top.
Figure 7:
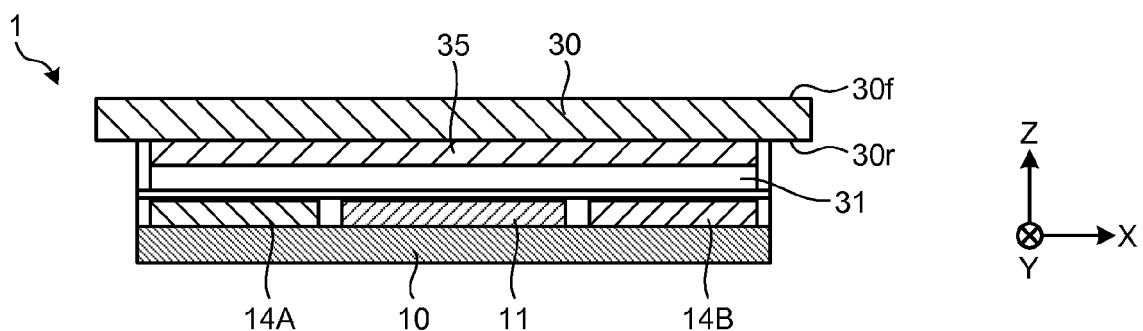
FIG. 7 is a sectional schematic for explaining the B-B section in FIG. 6.

FIG. 5 is a partial sectional view of the liquid-crystal display device according to the present embodiment. FIG. 6 is a plan view of the display device illustrated in FIG. 5 viewed from the top. FIG. 7 is a sectional schematic for explaining the B-B section in FIG. 6. The counter substrate 20 and the pixel substrate 10 illustrated in FIG. 5 are made of a translucent glass or plastic, for example.

As illustrated in FIG. 5, the liquid-crystal display device 1 includes the pixel substrate 10, the counter substrate 20, the polarizing plate 7 serving as an optical functional film, a resin layer 31, a plate spacer 35, and the translucent cover substrate 30 in the thickness direction (Z-direction).

The translucent cover substrate 30 is provided with wiring, components, and the like to have at least one function out of a touch panel that detects an external approaching object based on a change in an electrostatic capacitor, an input-output switch, and a barrier substrate that performs stereoscopic display using binocular disparity. The wiring and the components are formed more frequently on a rear surface 30r than on a front surface 30f of the translucent cover substrate 30.

The translucent cover substrate 30 has an area equal to or larger than those of the counter substrate 20 and the pixel substrate 10 such that the entire surface of the counter substrate 20 of the display panel 2 is bonded to the rear surface 30r. To form the light shielding region 3 illustrated in FIG. 1, a light shielding layer is provided to the rear surface 30r of the translucent cover substrate 30.

The pixel substrate 10 is provided with thin film transistor (TFT) elements serving as a circuit substrate. The pixel substrate 10 includes a plurality of pixel electrodes and common electrodes on the surface of the pixel substrate 10. The pixel electrodes are arranged in a matrix, and the common electrodes are formed in a manner insulated from the pixel electrodes. The pixel substrate 10 is further provided with wiring including pixel signal lines and scanning signal lines, for example. The pixel signal lines supply pixel signals to the pixel electrodes via the TFT elements, and the scanning signal lines drive the TFT elements.

The liquid-crystal display device 1 according to the present embodiment employs a liquid-crystal driving system that uses an electric field generated in a direction parallel to the substrates (lateral direction), that is, a lateral electric field. Examples of the liquid-crystal display device that drives liquid crystals using a lateral electric field include, but are not limited to, liquid-crystal display devices provided with a fringe field switching (FFS) system, an in-plane switching (IPS) system, etc. The liquid-crystal display device 1 according to the present embodiment, however, is not limited to a lateral-electric-field liquid-crystal display device. The liquid-crystal display device 1 according to the present embodiment may include the common electrodes on the counter substrate 20 and employ a liquid-crystal driving system that uses an electric field generated in a longitudinal direction between the counter substrate 20 and the pixel substrate 10, that is, a longitudinal electric field. Examples of the liquid-crystal display device 1 according to the present embodiment that drives liquid crystals using a longitudinal electric field include, but are not limited to, liquid-crystal display devices provided with a twisted nematic (TN) system, a vertical alignment (VA) system, an electrically controlled birefringence (ECB) system, etc.

As illustrated in FIG. 2, one surface of the protruding portion 10a is provided with the driver IC 11 serving as a drive circuit and an input terminal (not illustrated) required to drive the display panel 2, for example. An external power source and various types of external devices are coupled to the driver IC 11 in the liquid-crystal display device 1, thereby supplying electric power and drive signals, respectively, to the display panel 2 via the FPC substrate 15.

As described above, the liquid-crystal display device 1 includes the pixel substrate 10, the counter substrate 20, the sealing member 12, and the liquid-crystal layer 13. The sealing member 12 is formed between the pair of substrates along the outer periphery of the pixel substrate 10. The liquid-crystal layer 13 is arranged at the region surrounded by the pixel substrate 10, the counter substrate 20, and the sealing member 12. The polarizing plate 7 serving as an optical functional film is bonded to the surface of the counter substrate 20 opposite to the pixel substrate 10 side. In the liquid-crystal display device 1, the counter substrate 20 has an area smaller than that of the pixel substrate 10. The region on the pixel substrate 10 not facing the counter substrate 20, that is, the protruding portion 10a is provided with the driver IC 11.

The housing frame 9 according to the present embodiment includes an inner frame 9F that shields the control unit 50 and the liquid-crystal display device 1. The inner frame 9F may possibly abut on the surface of the pixel substrate 10 opposite to the surface on which the driver IC 11 is mounted, thereby applying pressure P to the translucent cover substrate 30. This is caused by reduction in the thickness of the housing frame (accommodating member) 9 along with reduction in the thickness of the electronic apparatus 100 to which the liquid-crystal display device 1 is mounted.

Because the FPC substrate 15 is disposed with tension acting between the first end and the second end, the pixel substrate 10 may possibly receive the pressure P caused by the FPC substrate 15.

The translucent cover substrate 30 has an area and a thickness larger than those of the pixel substrate 10 and is less likely to deform than the pixel substrate 10 is. Because the counter substrate 20 has an area smaller than that of the pixel substrate 10, the pixel substrate 10 bends using a portion near the end of the counter substrate 20 closer to the driver IC 11 as a fulcrum.

Because the pixel substrate 10 bends in the light shielding region 3, the bend seems to have no influence on display. Actually, however, the influence of the bend changes the thickness of the liquid-crystal layer 13 near the end closer to the driver IC. The change in the thickness of the liquid-crystal layer 13 changes the orientation of liquid crystals. As a result, the observer may possibly recognize a change in color at an end of the display region 4 (boundary between the display region 4 and the light shielding region 3 closer to the driver IC) in the liquid-crystal display device 1 as display unevenness. In other words, even if the liquid-crystal display device 1 causes no display unevenness by itself, the combination of the liquid-crystal display device 1 and the housing frame (accommodating member) 9 fixes the translucent cover substrate 30. This configuration may possibly apply the pressure P from the side of the pixel substrate 10 opposite to the translucent cover substrate 30 side (rear surface of the liquid-crystal display device 1). The liquid-crystal display device 1 according to the present embodiment prevents the pixel substrate 10 from bending.

The liquid-crystal display device 1 according to the present embodiment includes the plate spacer 35 formed in a rectangular plate shape. The plate spacer 35 is fixed to the rear surface 30r of the translucent cover substrate 30. The plate spacer 35 is made of a translucent material, such as polyethylene terephthalate. As illustrated in FIGS. 5 and 6, the plate spacer 35 is arranged at a position overlapping with the driver IC 11 on the pixel substrate 10 in a planar view. The gap between the plate spacer 35 and the driver IC 11 is filled with the resin layer 31. The length W2 in the width direction of the place spacer 35 is equal to or smaller than the length W1 in the width direction of the pixel substrate 10 and equal to or larger than the length W3 in the width direction of the driver IC 11. The length W2 in the width direction of the place spacer 35 is preferably larger than the length W3 in the width direction of the driver IC 11. This structure absorbs a mounting error of the plate spacer 35 onto the translucent cover substrate 30, thereby facilitating the arrangement of the plate spacer 35 at a position overlapping with the driver IC 11 on the pixel substrate 10 in a planar view.

The thickness D1 of the plate spacer 35 is preferably 50% to 80% of a distance (D2−D3) obtained by subtracting the maximum thickness D3 (height) of the driver IC 11 from the distance D2 between the pixel substrate 10 and the translucent cover substrate 30. If the thickness D1 of the plate spacer 35 exceeds (D2−D3)×(80/100), the plate spacer 35 may possibly interfere with the driver IC 11 because of the thickness tolerance. The interference may possibly cause the protruding portion 10a of the pixel substrate 10 to bend. If the thickness D1 of the plate spacer 35 is smaller than (D2−D3)×(80/100), the volume filling the space between the translucent cover substrate 30 and the driver IC 11 may possibly be reduced, resulting in reduced rigidity.

An end surface m1 in the longitudinal direction and the outer edge side of the plate spacer 35 is positioned on the outside of an end surface 11 in the longitudinal direction and the outer edge side of the driver IC 11. An end surface m2 in the longitudinal direction and the inner side of the plate spacer 35 is positioned on the inside of an end surface 12 in the longitudinal direction and the inner side of the driver IC 11. The end surface m2 in the longitudinal direction and the inner side of the plate spacer 35 is positioned between the counter substrate 20 and the driver IC 11 in a planar view. This structure facilitates the arrangement of the plate spacer 35 at a position overlapping with the driver IC 11 on the pixel substrate 10 in a planar view.

The plate spacer 35 fills the space between the translucent cover substrate 30 and the driver IC 11, thereby increasing the rigidity. When the pressure P is applied to the liquid-crystal display device 1 according to the present embodiment, the fulcrum of the bend of the pixel substrate 10 moves from the portion near the end surface of the counter substrate 20 to the portion near the end surface 11 in the longitudinal direction and the outer edge side of the driver IC 11. Thus, the liquid-crystal display device 1 suppresses the bend near the end surface of the counter substrate 20, thereby suppressing a change in the thickness (cell gap) of the liquid-crystal layer 13.

The resin layer 31 is an ultraviolet (UV) curing resin and shrinks when cured. In a case where the space between the translucent cover substrate 30 and the driver IC 11 is filled with the resin layer 31 alone like the technology described in JP-A-2010-91966, for example, the pixel substrate 10 may possibly be bent by curing of the resin layer 31 without any change in the position of the fulcrum of the bend on the pixel substrate 10 from the portion near the end surface of the counter substrate 20. The plate spacer 35 in the liquid-crystal display device 1 according to the present embodiment can prevent the resin layer 31 from leaking out of the pixel substrate 10 when the resin layer 31 is not cured yet. Because the plate spacer 35 according to the present embodiment has a translucent property, the resin layer 31 can be cured by externally received UV through the plate spacer 35. Thus, the plate spacer 35 can prevent the resin layer 31 from leaking out of the pixel substrate 10 when the resin layer 31 is not cured yet.

As illustrated in FIG. 7, the liquid-crystal display device 1 preferably further includes, on the pixel substrate 10, a plate spacer 14A and a plate spacer 14B formed in a rectangular plate shape on both sides of the driver IC 11. The size in the thickness direction of the plate spacers 14A and 14B is substantially the same as that of the driver IC 11. The thickness of the plate spacers 14A and 14B is determined based on their material. In consideration of a general tolerance, the size in the thickness direction of the plate spacers 14A and 14B substantially the same as that of the driver IC 11 means 90% to 110% of the size in the thickness direction of the driver IC, for example. With this structure, the distance between the facing surfaces of the plate spacer 35 and the driver IC 11 is substantially the same as that of the plate spacer 35 and the plate spacers 14A and 14B.

The plate spacer 35 is arranged at a position where at least a part of which overlaps with the driver IC 11 and the plate spacers 14A and 14B on the pixel substrate 10 in a planar view. In a case where the liquid-crystal display device 1 according to the present embodiment includes the plate spacers 14A and 14B serving as a second plate spacer on both sides in the width direction of the driver IC 11 on the pixel substrate 10, the plate spacer 35 and the plate spacers 14A and 14B have portions facing each other. With this structure, the liquid-crystal display device 1 according to the present embodiment can further increase the rigidity of the pixel substrate 10 in the width direction against the pressure P. This structure can facilitate movement of the fulcrum of the bend on the pixel substrate 10 from the portion near the end surface of the counter substrate 20 to the portion near the end surface 11 in the longitudinal direction and the outer edge side of the driver IC 11. The plate spacers 14A and 14B protect the corners of the pixel substrate 10, thereby suppressing breakage of the pixel substrate 10, for example. The size in the longitudinal direction (Y-axis direction) of the plate spacers 14A and 14B is substantially the same as that of the protruding portion 10a. In consideration of a bonding tolerance, the size in the longitudinal direction (Y-axis direction) of the plate spacers 14A and 14B is preferably approximately −1 mm of that of the protruding portion 10a.

Figure 8:
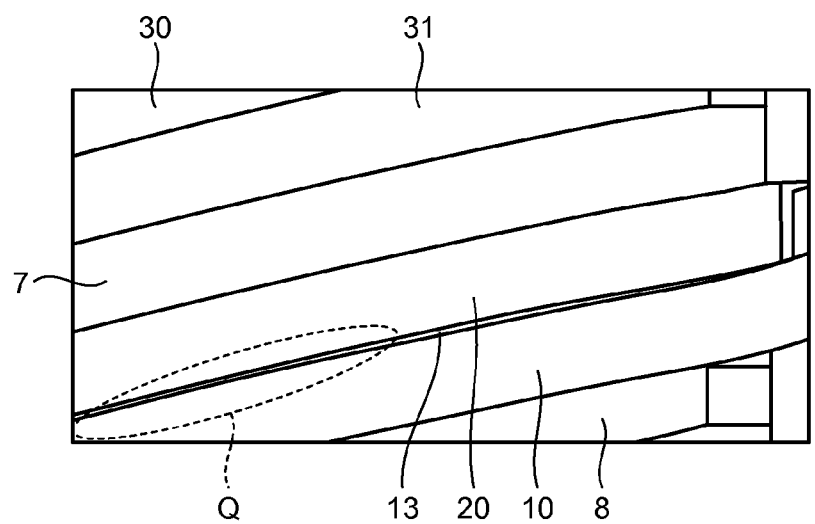
FIG. 8 is a schematic for explaining a state of a position Q indicating an end of a display region in FIG. 4.
Figure 9:
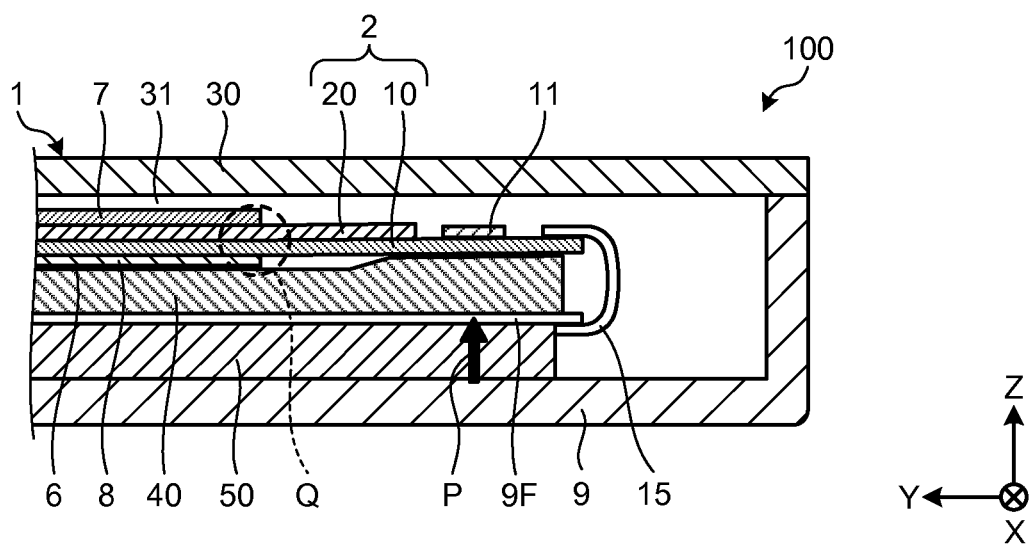
FIG. 9 is a partial sectional view for explaining a state where the liquid-crystal display device according to a comparative example is arranged in a housing of an electronic apparatus.
Figure 10:
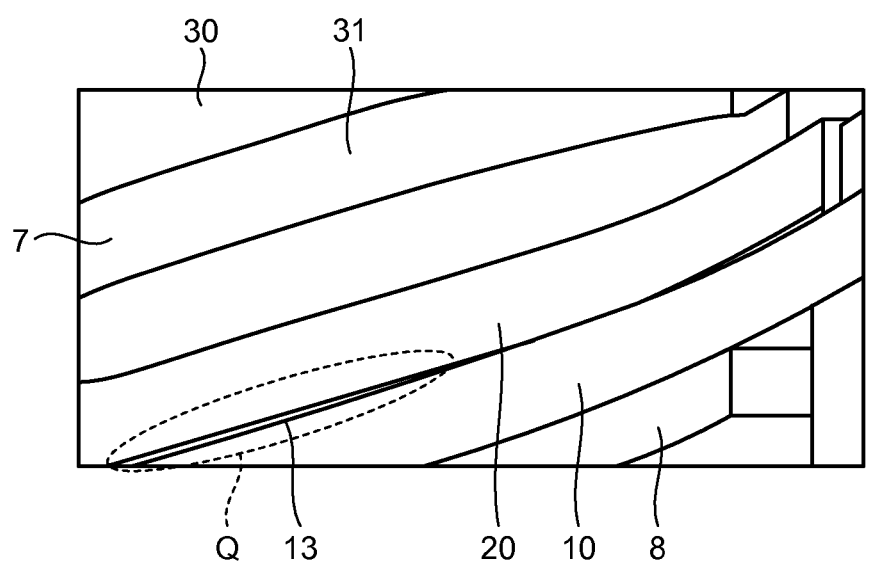
FIG. 10 is a schematic for explaining a state of the position Q indicating an end of a display region in FIG. 9.

FIG. 8 is a schematic for explaining a state of a position Q indicating an end of the display region in FIG. 4. FIG. 9 is a partial sectional view for explaining a state where a liquid-crystal display device according to a comparative example is arranged in a housing of an electronic apparatus. FIG. 10 is a schematic for explaining a state of a position Q indicating an end of the display region in FIG. 9. Before an explanation of FIG. 8, the following describes the liquid-crystal display device according to the comparative example with reference to FIG. 9.

As illustrated in FIG. 9, the liquid-crystal display device according to the comparative example also includes the resin layer 31 in the thickness direction between the polarizing plate 7 and the translucent cover substrate 30. The liquid-crystal display device, however, does not include the plate spacer 35 and the resin layer 31 in the thickness direction between the driver IC and the translucent cover substrate 30 unlike the liquid-crystal display device 1 according to the present embodiment. With this structure, the pixel substrate 10 serves as what is called a cantilever having the fulcrum of the bend thereof at the portion near the end surface of the counter substrate 20. This structure increases variations caused by the pressure P in the thickness direction of the portion on which the driver IC is mounted. FIGS. 8 and 9 illustrate a simulated state of the position Q in the liquid-crystal display device 1 according to the present embodiment illustrated in FIG. 4 and the liquid-crystal display device according to the comparative example illustrated in FIG. 9, respectively, in a case where the same pressure P is applied from the surface of the pixel substrate 10 opposite to the surface on which the driver IC is mounted to the translucent cover substrate 30. The change in the thickness (cell gap) of the liquid-crystal layer 13 illustrated in FIG. 8 is smaller than that of the liquid-crystal layer 13 illustrated in FIG. 10.

Figure 11:
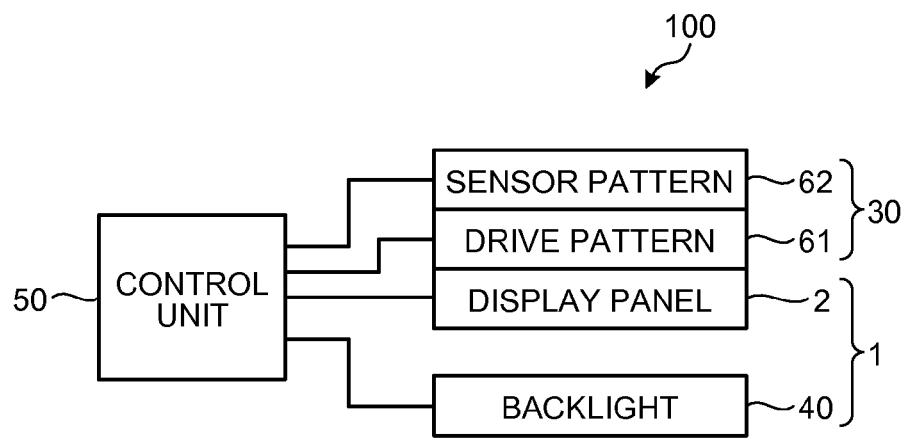
FIG. 11 is a functional block diagram of the liquid-crystal display device according to the present embodiment.

FIG. 11 is a functional block diagram of the liquid-crystal display device according to the present embodiment. The translucent cover substrate 30 in the liquid-crystal display device 1 according to the present embodiment is a touch panel that detects an external approaching object based on a change in an electrostatic capacitor. The translucent cover substrate 30 includes a drive pattern 61 and a sensor pattern 62. The control unit 50 can transmit predetermined signals to a predetermined number of drive patterns, thereby driving them. The sensor pattern 62 includes a plurality of stripe-shaped electrode patterns extending in a direction intersecting with the extending direction of the drive pattern 61. The sensor pattern 62 transmits a change in the electrostatic capacitor at the intersection with the drive pattern 61 to the control unit 50. Based on the change in the electrostatic capacitor received from the sensor pattern 62, the control unit 50 can detect an external approaching object. The control unit 50 can control the display panel 2 and the backlight (lighting device) 40 depending on video.

Figure 12:
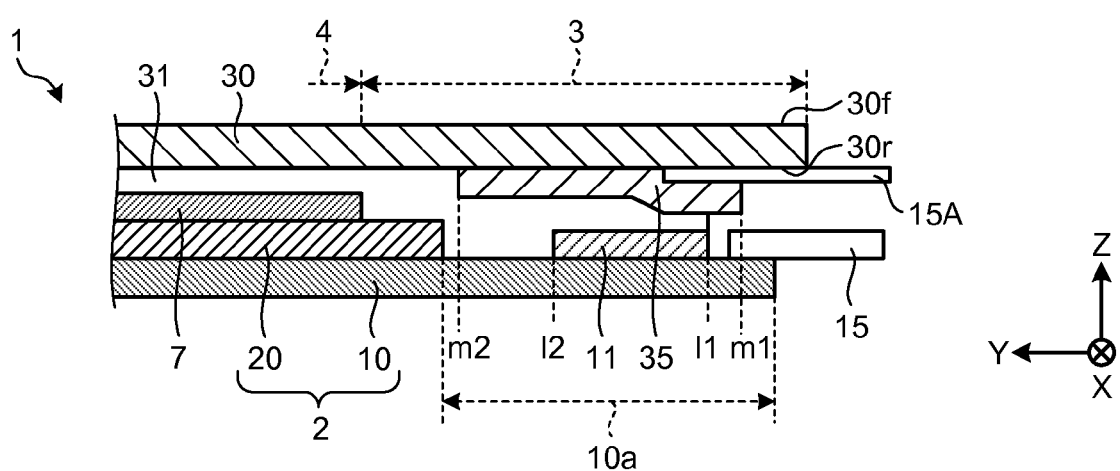
FIG. 12 is a partial sectional view of the liquid-crystal display device according to a modification of the present embodiment.

FIG. 12 is a partial sectional view of the liquid-crystal display device according to a modification of the present embodiment. The liquid-crystal display device 1 according to the present embodiment further includes an FPC substrate (flexible printed circuit; flexible wiring substrate) 15A coupled to the rear surface 30r of the translucent cover substrate 30. The FPC substrate 15A includes wiring that electrically couples the control unit 50 to the drive pattern 61 and the sensor pattern 62.

The inner surface (first surface) on a first end of the FPC substrate 15A is electrically coupled and bonded to a terminal on the rear surface 30r with an ACF (conductive adhesive), and a second end thereof is electrically coupled to the control unit 50 illustrated in FIG. 4. A part of the plate spacer 35 protrudes over the first end of the FPC substrate 15A.

As described above, the liquid-crystal display device 1 according to the present embodiment includes the display panel 2, the translucent cover substrate 30, and the plate spacer 35. The display panel 2 includes the pixel substrate 10, the counter substrate 20 facing the pixel substrate 10, and the liquid-crystal layer 13 interposed between the pixel substrate 10 and the counter substrate 20. The display panel 2 further includes the driver IC 11 mounted on the protruding portion 10a of the pixel substrate 10 protruding from the counter substrate 20. The translucent cover substrate 30 is bonded to the display panel 2. The plate spacer 35 is formed in a rectangular plate shape and is fixed to the surface of the translucent cover substrate 30 on the driver IC 11 side (rear surface 30r). The plate spacer 35 and the driver IC 11 are fixed with the resin layer 31 interposed therebetween.

With this structure, the liquid-crystal display device 1 can fill the space between the translucent cover substrate 30 and the driver IC 11 with the plate spacer 35, thereby increasing the rigidity against the pressure P around the driver IC 11. When the pressure P is applied to the liquid-crystal display device 1 according to the present embodiment, the fulcrum of the bend of the pixel substrate 10 moves from the portion near the end surface of the counter substrate 20 to the portion near the end surface 11 in the longitudinal direction and the outer edge side of the driver IC 11. Thus, the liquid-crystal display device 1 suppresses the bend near the end surface of the counter substrate 20, thereby suppressing a change in the thickness (cell gap) of the liquid-crystal layer 13. As a result, it is possible to prevent the observer from recognizing a change in color at the end of the display region 4 in the liquid-crystal display device 1 according to the present embodiment even in the electronic apparatus 100 where the liquid-crystal display device 1 is housed in the housing frame (accommodating member) 9 and where the inner frame 9F serving as a part of the housing frame (accommodating member) 9 presses the pixel substrate 10.

The plate spacer 35 has a size covering the driver IC 11 in a planar view. This structure can absorb a bonding error between the translucent cover substrate 30 and the display panel 2, thereby stably increasing the rigidity against the pressure P around the driver IC 11.

As described above, the polarizing plate 7 serving as an optical functional film is bonded to the surface of the counter substrate 20 opposite to the pixel substrate 10 side. The area of the polarizing plate 7 is smaller than that of the counter substrate 20 and equal to or larger than that of the display region 4. This structure can minimize the area of the polarizing plate 7, which is expensive, thereby reducing the cost. If the pixel substrate 10 receives the pressure P with the polarizing plate 7 having a smaller area than that of the counter substrate 20, the fulcrum of the bend of the pixel substrate 10 is positioned at a portion near the end surface of the polarizing plate 7. As a result, the liquid-crystal layer 13 is more likely to be affected by the bend of the pixel substrate 10. By contrast, when the pixel substrate 10 receives the pressure P in the liquid-crystal display device 1 according to the present embodiment, the fulcrum of the bend of the pixel substrate 10 moves to the portion near the end surface 11 in the longitudinal direction and the outer edge side of the driver IC 11. Thus, it is possible to minimize the area of the polarizing plate 7, which is expensive.

The contents described above are not intended to limit the embodiment. The components in the embodiment above include components easily conceivable by those skilled in the art and components substantially identical therewith, that is, what is called equivalent components. Furthermore, various omissions, substitutions, and changes in the components may be made without departing from the gist of the embodiment above.

According to the embodiment, the present disclosure includes the following aspects.

(1) A liquid-crystal display device including:
  a display panel including a pixel substrate, a counter substrate facing the pixel substrate, a liquid-crystal layer interposed between the pixel substrate and the counter substrate, and a driver IC mounted on a protruding portion of the pixel substrate protruding from the counter substrate;

a translucent cover substrate bonded to the display panel; and a plate spacer formed in a rectangular plate shape and fixed to a surface of the translucent cover substrate on the driver IC side, wherein the plate spacer and the driver IC are fixed with a resin layer interposed therebetween.

(2) The liquid-crystal display device according to claim 1, wherein the plate spacer has a size covering the driver IC in a planar view.

(3) The liquid-crystal display device according to (1) or (2), wherein the plate spacer has a translucent property, and the resin layer is an ultraviolet curing resin.

(4) The liquid-crystal display device according to any one of (1) to (3), wherein the counter substrate is provided with an optical functional film on a surface opposite to the pixel substrate side, and an area of the optical functional film is smaller than that of the counter substrate.

(5) The liquid-crystal display device according to any one of (1) to (4), wherein the plate spacer is a first plate spacer, the pixel substrate includes two second plate spacers, one of the second plate spacers being arranged on one side in the width direction of the driver IC, and another of the second plate spacers being arranged on another side in the width direction of the driver IC, and the first plate spacer and the second plate spacer have portions facing each other.

(6) An electronic apparatus including:

the liquid-crystal display device according to any one of (1) to (5); and an accommodating member housing the liquid-crystal display device, wherein a part of the accommodating member presses the pixel substrate.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid-crystal display device comprising:

a display panel including a pixel substrate, a counter substrate facing the pixel substrate, a liquid-crystal layer interposed between the pixel substrate and the counter substrate, and a driver IC mounted on a protruding portion of the pixel substrate protruding from the counter substrate;

a translucent cover substrate bonded to the display panel; and a plate spacer formed in a rectangular plate shape and fixed to a surface of the translucent cover substrate on the driver IC side, wherein the plate spacer is positioned so as to overlap the driver IC in a planer view, wherein an optical functional film is bonded to a surface of the counter substrate, the surface being opposite to a surface of the counter substrate facing the pixel substrate, and wherein a gap between the optical functional film and the translucent cover substrate, a gap between the counter substrate and the translucent cover substrate, a gap between the pixel substrate and the plate spacer, and a gap between the plate spacer and the driver IC are filled with a resin layer.

2. The liquid-crystal display device according to claim 1, wherein the plate spacer has a size covering the driver IC in a planar view.

3. The liquid-crystal display device according to claim 1, wherein the plate spacer has a translucent property, and the resin layer is an ultraviolet curing resin.

4. The liquid-crystal display device according to claim 1, wherein an area of the optical functional film is smaller than that of the counter substrate.

5. The liquid-crystal display device according to claim 1, wherein the plate spacer is a first plate spacer, the pixel substrate includes two second plate spacers, one of the second plate spacers being arranged on one side in the width direction of the driver IC, and another of the second plate spacers being arranged on another side in the width direction of the driver IC, and the first plate spacer and the second plate spacer have portions facing each other.

6. An electronic apparatus comprising:

a liquid-crystal display device; and an accommodating member housing the liquid-crystal display device, wherein the liquid-crystal display device includes:

a display panel including a pixel substrate, a counter substrate facing the pixel substrate, a liquid-crystal layer interposed between the pixel substrate and the counter substrate, and a driver IC mounted on a protruding portion of the pixel substrate protruding from the counter substrate;

a translucent cover substrate bonded to the display panel; and a plate spacer formed in a rectangular plate shape and fixed to a surface of the translucent cover substrate on the driver IC side, wherein the plate spacer is positioned so as to overlap the driver IC in a planer view, wherein an optical functional film is bonded to a surface of the counter substrate, the surface being opposite to a surface of the counter substrate facing the pixel substrate, wherein a gap between the optical functional film and the translucent cover substrate, a gap between the counter substrate and the translucent cover substrate, a gap between the pixel substrate and the plate spacer, and a gap between the plate spacer and the driver IC are filled with a resin layer, and wherein a part of the accommodating member presses the pixel substrate.

* * * * *